Feb. 25, 1969    W. G. HULEY ET AL    3,429,552
ADJUSTABLE RATE VALVE ASSEMBLY
Filed July 8, 1965

INVENTOR.
WILLIAM G. HULEY
HOWARD L. ERICKSON
JOHN W. HANNA
BY Hill, Sherman, Meroni, Gross & Simpson
ATTORNEYS United States Patent Office 3,429,552
Patented Feb. 25, 1969

3,429,552
ADJUSTABLE RATE VALVE ASSEMBLY
William G. Huley, Palatine, Howard L. Erickson, Bensenville, and John W. Hanna, Wheaton, Ill., assignors to The Dole Valve Company, Morton Grove, Ill., a corporation of Illinois
Filed July 8, 1965, Ser. No. 470,447
U.S. Cl. 251—129
Int. Cl. F16k 31/02, 31/44, 1/00
2 Claims

ABSTRACT OF THE DISCLOSURE

A fluid control valve having an electromagnetically actuable valve operator connected to the valve head and reciprocable in the valve body with adjustable means limiting the extent of movement of the valve operator whereby to limit the extent of movement permitted of the valve head relative to its respective valve seat.

---

Figure 1:
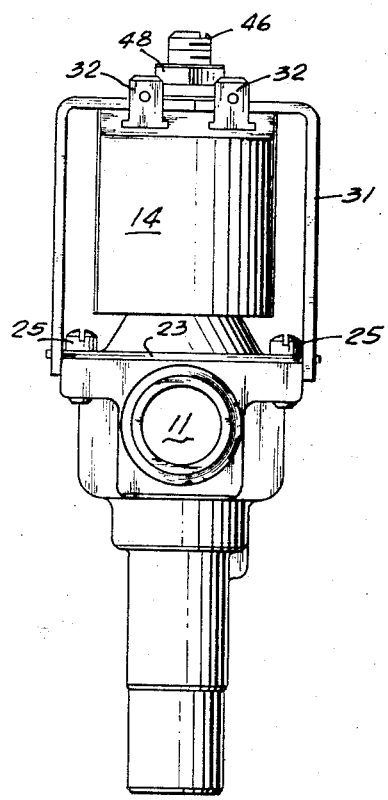

The present invention relates to a fluid control valve and more particularly relates to a fluid control valve wherein means are provided for adjusting the stroke of the valve member relative to its respective port to control the rate of fluid flow through the valve.

Fluid shut-off valves are commonly employed in coin-controlled vending machines as well as in dishwashers, washing machines, and other such appliances for controlling the rate of fluid delivery to a point of utilization under the cyclic control of a timer.

It is desirable to provide a means whereby the rate of fluid flow can be adjusted so that a single valve can be used in many different environments or in machines produced by various manufacturers without altering the valve for each separate use. Different laundry, vending machine or dishwasher manufacturers may, for instance, employ timers providing the same shut-off valve energization period but desire different volumes of water to be delivered during that period of time.

Still further, it may be desirable to provide a means whereby factory adjustment of a shut-off valve in a given machine can be effected prior to delivery of the machine to insure that the exact quantity of liquid is delivered during a given period of time.

What we have devised is a fluid control valve wherein a solenoid actuator is employed for controlling the movement of a poppet valve relative to a port seat. In accordance with the present invention, the valve head cooperable with the port seat is connected with the armature of the solenoid. A spring is employed to bias the armature and connected valve head to a port-closing, seated position and a stop is provided to limit the degree of port-opening movement of said valve head and armature. The stop is adjustable so that the stroke of the armature can be varied as desired to thereby control the distance which the valve head will move away from the valve seat upon energization of the solenoid and in this manner the rate of fluid delivery of the valve can be regulated.

In fact, the adjustment means for locating the stop is effective to locate the stop between a position permitting no port-opening movement of said armature and a position permitting sufficient movement of said armature and valve head to permit substantially full fluid flow through the port so that an infinite variation between these points is provided for.

In order to insure that the solenoid assembly and its associated components, including the armature, will be protected from the adverse effects of the fluid flowing through the system and/or foreign particles carried thereby, the spring means which serves to bias the armature and valve head in a port-closing direction is positioned on the opposite side of an imperforate diaphragm from the inlet, port, and outlet. In addition, such positioning of the spring protects the liquid flowing through the valve from contamination; such an arrangement being important when the valve is employed to control the flow of an edible liquid.

It is therefore a principal object of the present invention to provide an improved fluid control valve having adjustable means for controlling the rate of fluid delivery from the valve.

Another object of the invention resides in the provision of a fluid control valve of the general type mentioned above wherein a poppet valve is employed for the purpose of controlling the flow of fluid through the valve and in which means are provided to control the extent of rectilinear movement of the poppet valve, whereby to regulate the rate of fluid delivery from the valve.

Figure 2:
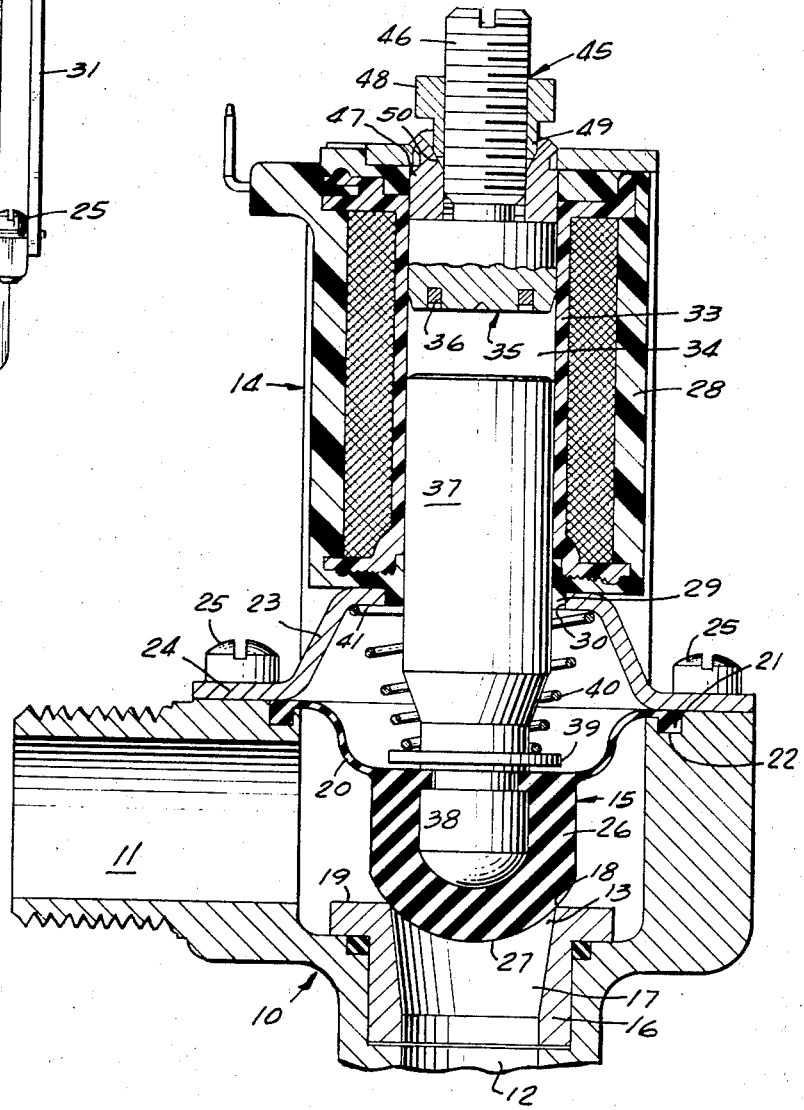

These and other objects, features, and advantages of the present invention will become apparent from time to time as the following specification proceeds and with reference to the accompanying drawings, wherein:

FIGURE 1 is an elevational view of a device constructed in accordance with the principles of the present invention; and FIGURE 2 is a vertical sectional view through the device shown in FIGURE 1.

The valve assembly shown in the drawings comprises a valve body 10 having an inlet 11, an outlet 12, and a port 13 communicating the inlet with the outlet. A solenoid assembly 14 is mounted on the valve body and controls movement of a rectilinearly movable valve member 15 relative to the port 13 to control the passage of fluid through the port.

More specifically, an outlet fitting 16 is seated within a diametrically enlarged section of the outlet passage 12 and has a wall 17 which converges from the upstream toward the downstream end thereof to provide for a full free flow of fluid through the outlet from the inlet when the valve member 15 is in a port flow-open position. A knife edge valve seat 18 is provided at the junction between a horizontally extending annular shoulder 19 of the fitting 16 and the tapered wall 17 and the valve member cooperates with this seat to control the flow of fluid through the valve assembly.

An impervious, thin-walled, flexible diaphragm 20 is fitted within the valve body in a position overlying the port 13 and has an enlarged peripheral bead 21 formed integrally therewith which is seated within an annular groove 22 formed within the valve body. A bracket 23 has a flat annular rim 24 lying on top of the beaded section of the diaphragm to hold the periphery of the diaphragm firmly within the groove 22 and this bracket is, in turn, fixed in the illustrated position by screws 25 extending into the valve body.

An enlarged resilient valve head 26 is formed integrally with the diaphragm 20 and centrally thereof and has a rounded nose 27 formed thereon which nose is engageable with the knife edge seat 18 to shut off flow through the port 13. The rounded head 27 cooperates with the fitting 16 to insure that the possibility of particle entrapment between the valve head and its seat during closure of the valve member will be minimized.

An encapsulated solenoid coil structure 28 is fitted on the bracket 23 with a depending annular lip 29 formed integrally therewith extending into an aperture 30 formed in the bracket 23 and the coil assembly is maintained in this position by a U-shaped bracket 31 extending over the top of the coil assembly and connected to the bracket 23 in the manner illustrated in FIGURE 1. Upturned terminals 32 are adapted for connection with an electrical power supply in the well known manner.

The coil assembly 28 includes a bobbin 33 formed of a plastic material which serves to define an armature guide 34. A stop 35 is slidably fitted within the upper end of the guide 34 and has a shading ring 36 fitted therein.

An armature 37 is guided for slidable movement within the guide 34 and has a round nosed head end 38 fitted within a complementarily configurated hollow of the valve head 15 so that the valve head and armature will move together as a unit. An annular spring seat 39 is fitted on the lower end of the armature 37 above the diaphragm 20 and serves as the seat for the smaller diameter end of a conical compression spring 40. The opposite end of the spring 40 is seated on the inner annular shoulder 41 of the bracket 23 surrounding the opening 30. The spring 40 serves to bias the valve head 15 and armature 37 in a port-closing direction as is shown in FIGURE 2 and electrical energization of the coil assembly effects retractable movement of the armature relative to the coil and moves the armature 37 up with the guide 34 until the armature abuts the stop 35.

The rate of flow of fluid through the port 13 can be controlled by controlling the travel of the armature 37 to thereby control the distance that the valve head moves away from the knife-edge seat upon energization of the coil.

Control of the armature stroke is provided by an adjustment 45 for positioning the stop 35 within the guide 34. As shown in the drawings, a threaded shank 46 is threadedly mounted within a fitting 47 mounted in the upper end of the coil assembly 28 and this threaded shank is engageable with the stop 35 to position the stop within the guide 34. A lock means or lock nut 48 is screwed onto the shank 46 and has a thin-walled section 49 which is screwed down into a wedge-shaped groove 50 in the upper end of the fitting 47. The thin walled section 49 and the groove 50 coact together to define means for radially gripping the threaded shank or shaft 46 in any axial position in the fitting 47 and therefore to lock the stop 35 in any of the adjusted positions in the guide 34. If necessary or desirable, the stop 35 and shank 46 can be formed integrally with one another or keyed to one another so that movement of the stop 35 by the shank 46 will be assured when the shank moves in either direction.

In any event, it will be observed that a shank 46 can be screwed into the point where no port-opening movement of the armature 37 will be permitted and that it is also positionable at a point permitting a good deal of armature movement to provide for maximum fluid flow through the port 13. An infinite number of variations are of course possible between these limits.

It will be understood that this embodiment of our invention has been used for illustrative purposes only and that various modifications and variations in the present invention may be effected without departing from the spirit and scope of the novel concepts thereof.

What we claim is:
1. A fluid control valve comprising:
 a valve body having an inlet and an outlet and a port communicating said inlet with said outlet;
 a knife edge valve seat defining said port;
 an imperforate diaphragm positioned within said valve body and having its periphery sealed to said valve body having said inlet, port, and outlet disposed on one side thereof;
 a resilient valve head formed integrally with said diaphragm and having cooperation with said knife edge valve seat for controlling the flow of fluid through said port;
 a solenoid mounted on said valve body having an electrical coil and having an armature guided for movement within said coil along an axis coincident with the axis of said port;
 means connecting said armature with said valve head;
 spring means cooperable with said armature to bias said armature and valve head to a port-closing position;
 wherein energization of said coil will move said armature and valve head in a port-opening direction against the opposing bias of said spring means;
 a stop limiting the degree of port-opening movement of said armature; and
 adjustable means having a shaft attached to said stop and lock means for locating said stop between a position permitting no port-opening movement of said armature and a position permitting sufficient movement of said armature and valve head to permit substantially full fluid flow through said port, said lock means including means for radially gripping said shaft to hold said shaft and stop in any one of the adjusted positions.

2. A fluid control valve according to claim 1:
 wherein said shaft is threadedly received in a fitting disposed on said solenoid; and
 wherein said means for radially gripping comprises a sleeve being threadedly received on said shaft for coaction with a wedge-shaped groove on said fitting.

References Cited

UNITED STATES PATENTS

| | | | |
|---|---|---|---|
| 1,822,668 | 9/1931 | Protzeller | 251—129 |
| 1,944,113 | 1/1934 | Shenton | 251—129 X |
| 2,357,013 | 8/1944 | McKinnis | 251—129 X |
| 2,705,608 | 4/1955 | Phillips | 251—129 X |
| 2,828,937 | 4/1958 | Kreitchman | 251—129 |
| 2,994,502 | 8/1961 | Ruzick et al. | 251—285 X |
| 3,034,761 | 5/1962 | Janquart | 251—129 X |
| 3,307,823 | 3/1967 | Greer | 251—30 |
| 1,389,056 | 8/1921 | Lane | 251—129 |
| 2,980,385 | 4/1961 | Hunter et al. | 251—46 X |
| 3,023,996 | 3/1962 | Robertson | 251—46 X |
| 3,134,570 | 5/1964 | Jarrett | 251—331 |
| 3,211,416 | 10/1965 | Billeter et al. | 251—331 X |
| 3,245,651 | 4/1966 | Erickson | 251—129 |

M. CARY NELSON, *Primary Examiner.*

R. C. MILLER, *Assistant Examiner.*

U.S. Cl. X.R.

251—258, 331